INVENTORS.
Gilbert V. O. Cook
Robert S. Henley
BY

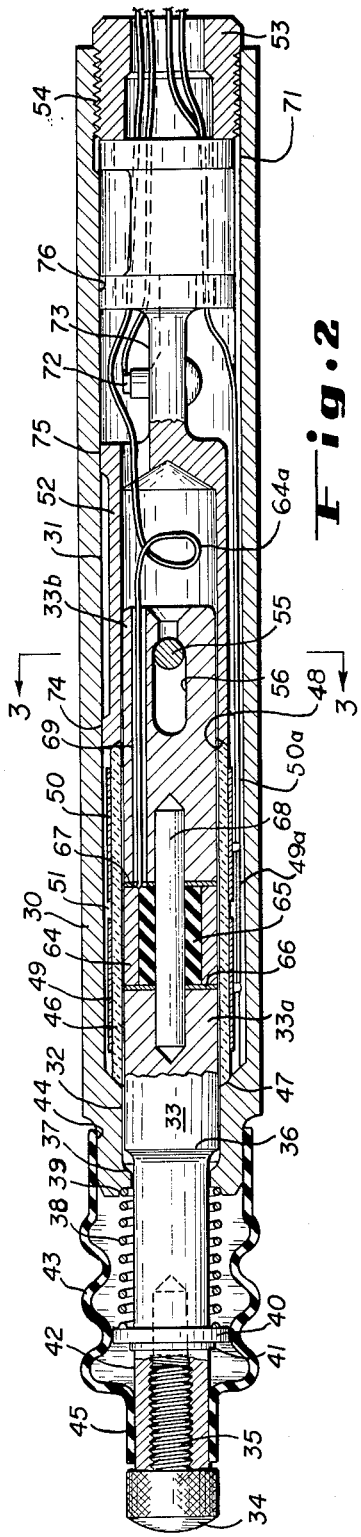
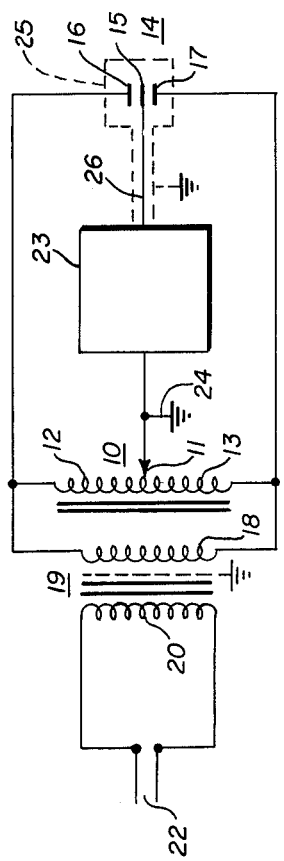
INVENTORS.
Gilbert V. O. Cook
Robert S. Henley
ATTORNEYS

ATTORNEYS

United States Patent Office 3,213,360
Patented Oct. 19, 1965

3,213,360
ELECTRONIC GAUGING SYSTEM
Gilbert V. O. Cook, Lakewood, and Robert S. Henley, Denver, Colo., assignors to K-F Products, Inc., Denver, Colo., a corporation of Colorado
Filed June 25, 1962, Ser. No. 204,906
9 Claims. (Cl. 324—61)

This invention relates to apparatus for measuring very small spatial displacements and particularly to an improved electronic gauging system of the differential capacitance type.

Many manufacturing operations in industry require that minute spatial or translational displacements be measured quickly and with extreme accuracy and many types of instruments, both mechanical and electrical, have been provided for applications of this type.

It is an object of the present invention to provide an improved electronic gauging system for measuring minute displacements and which is linear over a long useful range.

It is another object of this invention to provide an improved electronic gauging system of the differential capacitance transducer type which is of simple construction, accurate, and easy to operate.

It is a further object of this invention to provide an improved displacement transducer for electronic gauging systems.

Briefly, in carrying out the objects of this invention in one embodiment thereof, an impedance bridge is constructed to comprise an adjustable ratio impedance forming one half of the bridge and a displacement transducer comprising a differential capacitor forming the other half. The adjustable ratio impedance is connected to provide two arms, the center point being grounded and being connected to the adjustable plate of the capacitor through a null detecting device; a source of alternating potential is applied across the two halves of the bridge in parallel. The differential capacitor comprises three coaxial cylindrical plates—two plates of the same diameter with a small gap therebetween and the third an axially movable plate of smaller diameter within and spaced from the others. The transducer further includes a grounded guard arrangement which assures effective operation in spite of the small dimension of the transducer and the very small direct capacitance obtainable.

For a better understanding of the invention both as to its organization and manner of operation, together with further objects and advantages thereof, reference may be had to the following description taken in connection with the accompanying drawings in which:

FIG. 1 is a schematic circuit diagram of one embodiment of the invention;

FIG. 2 is a longitudinal sectional view of a transducer embodying the invention;

Figure 3:
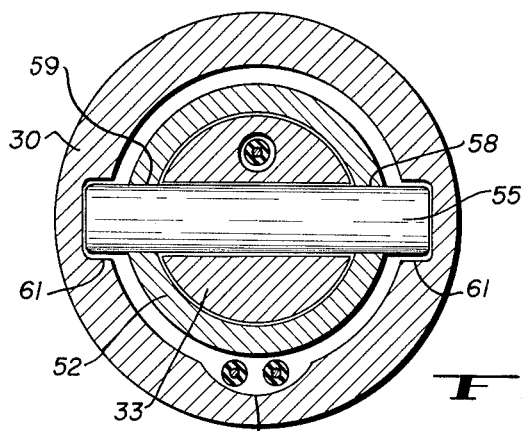
FIG. 3 is a sectional view along the line 3—3 of FIG. 2.

Referring now to the drawings, the system of this invention as illustrated in FIG. 1 comprises a balanced bridge circuit including a first half 10 having an adjustable tap 11 dividing the half bridge into two ratio arms 12 and 13. The other half of the bridge comprises a differential capacitor 14 including a movable plate 15 and a pair of stationary plates 16 and 17. The capacitor is thus divided into two arms and these arms are connected in the bridge with the arms of the adjustable ratio impedance 10. A source of alternating current illustrated as the secondary winding 18 of a transformer 19 is connected across the two halves of the bridge in parallel. The transformer has a primary winding 20 connected across a suitable source of alternating current potential indicated at 22.

The adjustable tap 11 and the center plate 15 of the differential capacitor 14 are connected through a null detecting device 23. The adjustable tap 11 is grounded as indicated by connection 24 which provides a ground for one side of the null detector and facilitates the measurement of direct capacitances particularly when the differential capacitor 14 is provided with grounded guard electrodes, as indicated at 25. This grounding arrangement greatly improves the null sensitivity of the system and avoids non-linearity due to electrical loading of the transducer 14, and thus makes the impedance of the null detector less a factor in the design and operation of the system. The adjusted position of the tap 11 is used to indicate the position of the movable plate 15 of the capacitor.

The foregoing advantages of the grounding and guarding arrangement are such that, when the bridge is adjusted into balance for a null position of the detector either by adjusting the ratio arms of the device 10 or by adjusting the displacement of the differential capacitor, there will be no voltage on the center connection or node between the adjustable plate 15, conductor 26, and ground and therefore no current will be flowing from the connection 26 to ground.

The differential capacitor 14 is constructed as a probe for measuring minute straight line displacements. The differential capacitor comprises a pair of similar cylindrical axially spaced plates movable in relation to a third plate spaced therefrom and spanning the space between the two cylinders. The probe or transducer assembly as illustrated in FIG. 2 comprises a main body or housing 30 preferably constructed of a low-temperature-coefficient of expansion metal. The housing is provided with a cylindrical bore 31 having a reduced portion 32 near one end thereof through which protrudes a longitudinally movable plunger 33. A hardened metal contact tip 34 is secured to the outer end of the element 33 on threads 35.

The plunger 35 is provided with a reduced portion 42 extending from a shoulder 36 and which passes through a reduced section of the inner wall of the housing defined by an inwardly directed annular shoulder 37. The plunger 33 is urged or biased toward the left, as viewed in the drawing, by a compression spring 38 which is mounted between an internal shoulder or pocket 39 on the outer side of the shoulder 37 and a metal stop collar 40. The collar is secured in position on the plunger 33 by a retaining ring 41 which fits in an annular groove (not shown) in the plunger, and the stop 40 is pressed against the ring by the spring 38.

When assembling the transducer, the plunger 33 and the various parts of the transducer described below are inserted in the housing 30 through the right end thereof and moved therethrough until the reduced portion 42 passes through the opening within the shoulder 37 of the housing. Thereupon the spring 38 is seated in the shoulder 39 and the stop 40 placed over the end of the plunger against the spring and the spring is compressed until the groove for the retaining ring 41 is exposed, whereupon the retaining ring is held in place thereby holding the assembly together.

In order to prevent dust or other foreign matter from reaching the interior portions of the assembly a flexible sleeve or cover 43 is secured over the end of the plunger in sealing engagement therewith. The cover engages a seat 44 at the end of the housing 30 and has a portion 45 of reduced diameter engaging the end of the plunger 33.

The cover 43 is preferably formed with a bellows configuration in order to afford substantial longitudinal movement of the plunger. The contact point 34 is then inserted in the end of the plunger.

The transducer assembly inserted in the housing with the plunger includes a tube or hollow cylinder 46 of good dielectric material such as glass or quartz which, in the completed assembly, lies in the annular space between the housing 30 and the plunger 33 and engages a conical seat 47 formed on the interior of the housing 30 adjacent the reduced portion 32. The cylinder 46 constitutes the dielectric of the differential capacitor. The cylinder also is the sliding bearing for the plunger 33 and holds the metal surfaces of the plunger spaced from the interior wall of the housing. The cylinder 46 carries on its outer surface two thin cylindrical metal plates 49 and 50 which are axially spaced to provide a short gap 51 therebetween. The plates 49 and 50 are the two stationary plates of the differential capacitor.

The insulating cylinder 46 is held in the housing 30 by a clamping member 52 which is inserted with the plunger and insulating cylinder through the end of the housing until the cylinder is held between the conical seat 47 on the housing and a similar seat 48 on the member 52. The assembly is securely held in position by a threaded nut 53 which engages internal threads 54 in the outer end of the housing and locks the clamping member 52 in position. The engaging surfaces at the ends of the cylinder 46 which engage the seats 47 and 48 preferably are made spherical so that only a circular line contact is obtained between the conical seats or shoulders and the ends of the cylinder. This facilitates the exact alignment of the cylinder 46 and its function as a bearing for the plunger 33.

The movement of the plunger 33 with respect to the housing 30 and hence with respect to the plates 49 and 50 is limited by a pin 55 which passes through a slot 56 in the plunger 33 and is secured in diametrically opposite openings 58 and 59 (FIG. 3) in the walls of the clamping member 52. The ends of the pin 55 extend beyond the walls of the clamping member 52 as clearly shown in the sectional view FIG. 3 and ride in longitudinal guide slots 61 one on either side of the interior wall of the housing 30. The pin thus not only limits the movement of the plunger with respect to the housing by virtue of the limited length of the slot 56 but also prevents rotation of the plunger and provides a longitudinal guide along the inner wall of the housing 30.

In a position adjacent the plates 49 and 50 on the cylinder 46 and always overlapping the gap 51, the plunger 33 carries a cylindrical plate 64 which is preferably of a metal having a low temperature coefficient of expansion and is insulated from the plunger 33 by an internal cylinder of phenolic resin or other good insulating material indicated at 65 and by end disks 66 and 67 which are constructed of good insulating material such as mica and separate the ends of the cylinder 64 from the body of the plunger 33.

The plunger 33 is constructed of two body portions, one indicated at 33a which carries the reduced portion 42 and the other 33b which carries the slot 56. The several parts of the plunger are secured together by a steel pin 68 which fits in bores in the portions 33a and 33b and holds the parts together by a press fit. A longitudinal bore 69 is provided through the portion 33b for passage of a shielded electrical lead 64a connected to the plate 64.

It will now be seen that the plate 64, which is shown in FIG. 2 in its extreme left-hand position, may move back and forth with respect to the plates 49 and 50 to the extent determined by the length of the slot 56 in the end 33b of the probe. Shielded electrical leads 49a and 50a connected to the two stationary plates 49 and 50 enter the housing through a groove 71 extending longitudinally along the lower inner wall of the housing and along the extent of the cylinder 46 where they are connected to the plates 49 and 50.

A ground wire is connected to the clamping member 52 by a screw 72 mounted on a reduced portion 73 of the clamp 52. The ground wire is thus connected to the plunger and the housing through the clamping member 52 which is in good electrical conducting relationship with the housing through the threaded plug 53 and through contact with the inner side walls of the housing through fitted annular portions indicated at 74, 75 and 76. In addition, the plunger portion 33a and the housing 30 are in direct electrical connection through the spring 38 and portions 33a and 33b are connected through the pin 55.

Thus all portions of the transducer assembly about the capacitor plates 49, 50 and 64 are grounded and this provides the grounded guarding for the differential capacitance. In this connection it is to be noted that the cylindrical portions 33a and 33b on either side of the plate 64, and which extend along and beyond both of the plates 49 and 50, are grounded. The extent of movement of the plate 64 is such that its end never reaches the gap 51 between the plates 49 and 50. Thus fringing capacitance effects are avoided.

Transducers constructed as shown in FIGS. 2 and 3 may be made of small dimensions and, as an example and not by way of limitation, one probe constructed with the same proportions as illustrated in these figures had a main body or housing 2¼ inches in overall length and an outside diameter of ⅜ inch.

It is well known that the capacitance per unit length of coaxial conductors is $$\frac{C}{l} = \frac{2\pi\epsilon}{\log_e \frac{r_2}{r_1}}$$

in which equation $\epsilon$ is the permittivity of the dielectric medium between the plates of the capacitance, $l$ is the length of the capacitance, $r_1$ is the external radius of the interior cylindrical plate, and $r_2$ is the internal radius of the external plate.

From this relation it can be deduced that the open circuit voltage transfer ratio of the coaxial differential capacitor is $$\frac{l_1}{L-d} = \frac{l_1}{l_1 + l_2}$$

wherein $l_1$ is the length of the portion of one of the two external plates which is overlapped by the internal plate, $l_2$ is the length of the portion of the other of the two external plates overlapped by the internal plate, L is the length of the internal plate, and $d$ is the effective length of the gap between the external plates corrected for fringing effects.

From these relations it is evident that the voltage transfer ratio of the coaxial differential capacitor can be made to have a low sensitivity to temperature changes by making it of material having low temperature coefficients of expansion. Furthermore, the sensitivity of the voltage transfer ratio to axial displacement of the moving electrode depends on controlling only two dimensions, L and $d$.

A gauging system employing a probe of the type described above has the advantage that it secures high linearity for a long stroke of the plunger. When a probe of this type is employed with a balanced bridge circuit, the auxiliary equipment from which the readings of the dimensions or displacements are to be obtained can be of extremely high accuracy.

A further advantage of this invention is that there is no self heat in the probe because the only heat in the transducer is due to the dielectric losses and such losses are entirely negligible. Temperature rise and warm-up time are therefore negligible. Because the sensitivity of the differential capacitance transducer depends only on the dimensions of the parts, provided of course that the materials are selected to be uniform and particularly that the dielectric medium be homogeneous, it is possible to reproduce these units with relatively close tolerances with respect to sensitivity. Thus systems employing several or many transducers of this type may be arranged for simultaneous or sequential measurements and calibration controls for the individual transducers are not then required.

Figure 4:
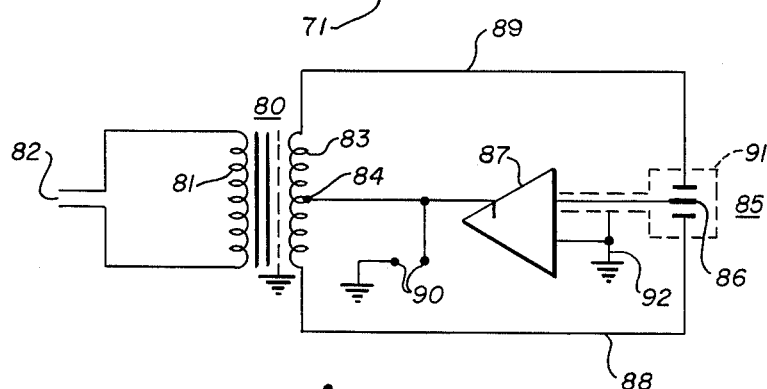
FIG. 4 is a schematic circuit diagram of another embodiment of the invention.

Various other circuit arrangements may be employed with a transducer assembly of this type, and by way of example FIG. 4 illustrates a bridge system where, instead of providing a movable contact to secure the variable impedance, a correcting voltage is applied to a center tap which gives the effect of mechanical adjustment in the movable contact forms. In the circuit of FIG. 4 a transformer 80 having a primary 81 supplied from a source of alternating current indicated at 82 is provided with a secondary 83 having a permanent center tap 84. The half of the bridge comprising the two halves of the secondary winding 83 is connected in parallel with the other half of the bridge comprising a differential capacitance 85 of the same construction as that employed in the circuit of FIG. 1. The center plate of the capacitance, indicated at 86, is connected to a high gain inverting amplifier 87 the output of which is connected to the center tap 84. Thus a correcting voltage dependent upon the position of the movable plate 86 of the capacitor is applied at the center tap and provides the effect of an adjustment of the ratio arms of the transformer. This voltage is either exactly in phase or 180° out of phase with the voltage from the upper connecting line or node 89 of the bridge to the lower node 88. The inverting amplifier is thus emlpoyed as a null detector; and the amplitude and phases of the amplifier output at terminals 90 may be employed for indicating the degree and direction of displacement of the plate 86. As in the modification of FIG. 1, guarding of the differential capacitance is required and a grounded guard 91 has been illustrated connected to a ground terminal 92 which is also connected to the amplifier 87.

It will be understood that servo-mechanisms operative in response to a signal such as that produced by the amplifier 87 may be employed to effect automatic balancing of the bridge by returning it to the null or balance position, the movement of the servo-mechanism being an indication of the displacement to be measured.

Figure 5:
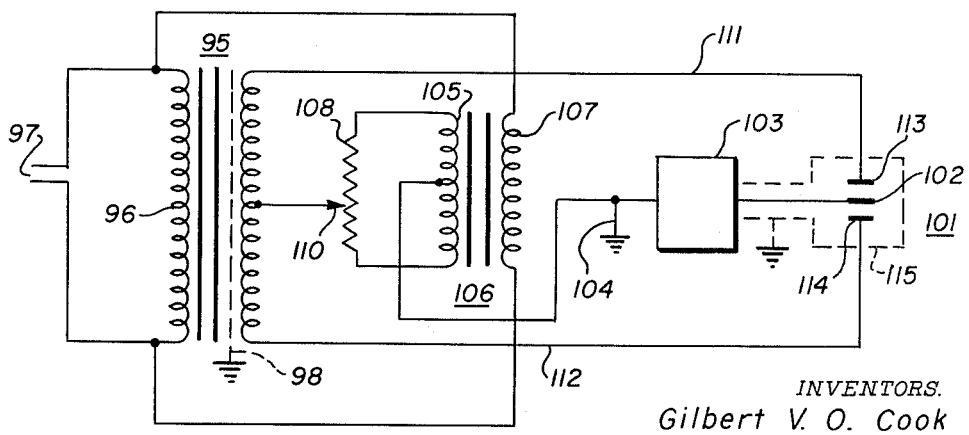
FIG. 5 is a schematic wiring diagram of a further embodiment of the invention.

FIG. 5 illustrates an alternative arrangement for employing a potentiometer to effect balancing of the device in a circuit otherwise similar to that of FIG. 1. In this circuit one half of the bridge comprises the secondary winding of a transformer 95 having a primary winding 96 connected across a suitable supply of alternating current indicated at 97. The transformer 95 is provided with a suitable grounded shield indicated at 98 and the secondary of the transformer has a center tap as indicated. The other half of the bridge comprises a differential capacitance essentially the same as those of FIGS. 1 and 4 and which is indicated at 101 and has a moving plate 102 connected to a null detector 103. The other side of the detector, grounded at 104, is connected to the center tap of the secondary winding 105 of a transformer 106 the primary winding 107 of which is connected across the supply line 97. The secondary winding 105 is connected across a variable potentiometer resistance 108, the movable contact 110 of which is connected to the center tap of the secondary winding of the transformer 95. The bridge circuit is completed by conductors indicated at 111 and 112 which are connected to the stationary plates 113 and 114, respectively. The differential capacitance 101 is guarded in the same manner as those in the other embodiments, the grounded shield being indicated by dotted lines 115.

During the operation of the circuit of FIG. 5 a displacement of the center plate of the probe 101 will unbalance the bridge, which may then be rebalanced by movement of the potentiometer contact 110. The position of the contact may then be read as the indication of the amount of displacement of the probe center plate.

While the invention has been described in connection with various circuit details and structural features, other applications and features of construction will occur to those skilled in the art. Therefore, it is not desired that the invention be limited to the specific details illustrated and described and it is intended by the appended claims to cover all modifications which fall within the spirit and scope of the invention.

We claim:

1. An electronic gauging system comprising a balanced impedance bridge having an adjustable ratio impedance means constituting one half thereof and a differential capacitor constituting the other half, said impedance means including a ratio tap defining two arms in said one half of the bridge, said capacitor comprising two coaxial cylindrical plates of equal diameter and spaced axially from one another and a third cylindrical plate coaxial with said two plates and spaced radially therefrom and coupled capacitively therewith and differentially movable axially with respect thereto and providing two oppositely variable capacitance arms for said other half of said bridge, means for impressing an alternating electric potential on said bridge across said impedance means and said capacitor in parallel, means connected between said third plate and the junction between said two arms of said one half of the bridge for detecting unbalance of said bridge, a ground connection between said detecting means and said junction, means for adjusting the effective ratios of said two arms of said one half of the bridge for balancing the bridge, means for moving said third plate with respect to said other plates in proportion to a dimension to be measured, and means dependent upon operation of said adjusting means for indicating the amount of displacement of said third plate with respect to said other plates.

2. An electronic gauging system comprising a balanced impedance bridge having an adjustable ratio impedance means constituting one half thereof and a differential capacitor constituting the other half, said impedance means including a ratio tap defining two arms in said one half of the bridge, said capacitor comprising two plates and a third plate coupled capacitively therewith and differentially movable with respect thereto and providing two oppositely variable capacitance arms for said other half of said bridge, means for impressing an alternating electric potential on said bridge across said impedance means and said capacitor in parallel, means connected between said third plate and the junction between said two arms of said one half of the bridge for detecting unbalance of said bridge, a ground connection between said detecting means and said junction, means for adjusting the effective ratios of said two arms of said one half of the bridge for balancing the bridge, means for moving said third plate with respect to said other plates in proportion to a dimension to be measured, means dependent upon operation of said adjusting means for indicating the amount of displacement of said third plate with respect to said other plates, and ground potential guarding means substantially surrounding and shielding said capacitance.

3. An electronic gauging system comprising a balanced impedance bridge having an adjustable ratio impedance means constituting one half thereof and a differential capacitor constituting the other half, said impedance means including a ratio tap defining two arms in said one half of the bridge, said capacitor comprising two coaxial cylindrical plates of equal diameter and spaced axially from one another and a third cylindrical plate coaxial with said two plates and spaced radially therefrom and coupled capacitively therewith and differentially movable axially with respect thereto and providing two oppositely variable capacitance arms for said other half of said bridge, means for impressing an alternating electric potential on said bridge across said impedance means and said capacitor in parallel, means connected between said third plate and the junction between said two arms of said one half of the bridge for detecting unbalance of said bridge, a ground connection between said detecting means and said junction, means for adjusting the effective ratios of said two arms of said one half of the bridge for balancing the bridge, means for moving said third plate with respect to said other plates in proportion to a dimension to be measured, means dependent upon operation of said adjusting means for indicating the amount of displacement of said third plate with respect to said other plates, and ground potential guarding means for said capacitance comprising a grounded housing for said capacitance and grounded cylindrical elements adjacent and insulated from the ends of said movable plate, said grounded elements being of substantially the same diameter as said movable plate and coaxial therewith.

4. In an electronic gauging system comprising an impedance bridge and an indicating device of the null detecting type, a displacement responsive transducer of the differential capacitance type for providing two oppositely variable capacitance arms of the bridge, said transducer comprising a cylindrical housing of conducting material, a plunger mounted for reciprocation in said housing and having a contact element extending axially therefrom, a hollow cylindrical insulator mounted in fixed position in said housing about said plunger, a pair of axially spaced cylindrical plates on said insulator on the side thereof remote from said plunger, a cylindrical plate on said plunger movable therewith adjacent said pair of plates, and means for limiting the length of the path of movement of said plunger with respect to said housing.

5. In an electronic gauging system comprising an impedance bridge and an indicating device of the null detecting type, a displacement responsive transducer as set forth in claim 4 wherein said hollow cylindrical insulator is formed to provide a sliding bearing for said plunger, and means inserted in said housing for locking said insulator in position.

6. An electronic gauging system as set forth in claim 4 including cylindrical conducting portions on said plunger in alignment with said cylindrical plate on said plunger and insulated therefrom for providing grounded guards for said capacitance.

7. In an electronic gauging system of the impedance bridge type, a displacement responsive transducer of the differential capacitance type for providing two oppositely variable capacitance arms of the bridge, said transducer comprising a cylindrical housing of conducting material having a main cylindrical bore and a concentric bore of reduced diameter at one end of the main bore, the walls of said bores being connected by a concentric conical wall portion, a plunger mounted for reciprocation in said housing, a hollow cylindrical insulator in said main bore having one end engaging said conical wall portion, said insulator surrounding said plunger, a clamping member secured in said main bore and having a conical wall portion engaging the other end of said insulator and securing said insulator in position in said main bore, a pair of axially spaced cylindrical plates on said insulator on the side thereof remote from said plunger, a cylindrical plate on said plunger movable with said plunger in overlapping relationship to said pair of plates, electric leads connected to the respective plates and extending outside said housing, and spring means for biasing said plunger to a predetermined position and affording movement of said plunger away from said position to move said plate on said plunger with respect to said pair of plates.

8. In an electronic gauging system of the impedance bridge type, a displacement responsive transducer as set forth in claim 7 wherein said insulator acts as a sliding bearing for said plunger and the ends of said insulator have spherical surfaces and engage the respective ones of said conical wall portions in circular line contact.

9. An electronic gauging system comprising a balanced impedance bridge having an adjustable ratio impedance means constituting one half thereof and a differential capacitor constituting the other half, said impedance means including a ratio tap defining two arms in said one half of the bridge, said capacitor comprising two plates and a third plate coupled capacitively therewith and differentially movable with respect thereto and providing two oppositely variable capacitance arms for said other half of said bridge, means for impressing an alternating electric potential on said bridge across said impedance means and said capacitor in parallel, means including an inverting amplifier connected between said third plate and said ratio tap for applying a correcting voltage to said tap for adjusting the effective ratios of the two arms of said one half of said bridge upon change of the ratio of said capacitance arms, means for moving said third plate with respect to said other plates in proportion to a dimension to be measured, and means utilizing the output of said amplifier for indicating the amount of displacement of said third plate with respect to said other plates.

References Cited by the Examiner

UNITED STATES PATENTS

| | | | |
|---|---|---|---|
| 2,431,841 | 12/47 | Storm | 324—61 |
| 2,684,473 | 7/54 | Shannon | 73—343.5 |
| 2,686,879 | 8/54 | Wen Yuan Pan et al. | 317—249 |

FOREIGN PATENTS

| | | |
|---|---|---|
| 892,962 | 1/44 | France. |
| 821,227 | 10/59 | Great Britain. |

OTHER REFERENCES

Clark, L. N.: Transformer Bridges for Use With Resistance Strain Gauges and Similar Transducers, in Journal of Scientific Instruments, vol. 37, pages 381–384, October 1960.

ISAAC LISANN, *Primary Examiner*.